(12) United States Patent
Kapala et al.

(10) Patent No.: US 8,430,083 B2
(45) Date of Patent: Apr. 30, 2013

(54) MIXER FOR USE IN AN EXHAUST GAS RECIRCULATION SYSTEM AND METHOD FOR ASSEMBLY OF THE SAME

(75) Inventors: David T. Kapala, Shelby Township, MI (US); Marcello Tedesco, Saline, MI (US)

(73) Assignee: Harvey Holdings, LLC, Westland, MI (US)

( * ) Notice: Subject to any disclaimer, the term of this patent is extended or adjusted under 35 U.S.C. 154(b) by 862 days.

(21) Appl. No.: 12/582,078

(22) Filed: Oct. 20, 2009

(65) Prior Publication Data

US 2011/0088673 A1    Apr. 21, 2011

(51) Int. Cl.
*F02B 47/08*    (2006.01)
*F02M 25/07*    (2006.01)

(52) U.S. Cl.
USPC .................................... 123/568.17; 60/605.2

(58) Field of Classification Search .................. 60/605.2; 123/568.17, 568.18; 366/338, 342, 343
See application file for complete search history.

(56) References Cited

U.S. PATENT DOCUMENTS

| | | | |
|---|---|---|---|
| 5,722,634 A | 3/1998 | Hrytzak et al. | |
| 5,924,398 A | 7/1999 | Choi | |
| 6,026,791 A | 2/2000 | Arnold | |
| 6,810,725 B2 | 11/2004 | Henderson et al. | |
| 6,945,199 B2 | 9/2005 | Kapala et al. | |
| 7,353,783 B2 | 4/2008 | Nishimura et al. | |
| 7,568,340 B2 * | 8/2009 | Marsal et al. | 60/605.2 |
| 2002/0088443 A1 * | 7/2002 | Marthaler et al. | 123/568.17 |
| 2008/0134678 A1 * | 6/2008 | Noelle et al. | 60/605.2 |
| 2009/0101123 A1 * | 4/2009 | Brogdon et al. | 123/568.15 |
| 2009/0107130 A1 * | 4/2009 | Emerick et al. | 60/324 |

FOREIGN PATENT DOCUMENTS

WO    2007130947 A1    11/2007

\* cited by examiner

*Primary Examiner* — Stephen K Cronin
*Assistant Examiner* — Sizo Vilakazi
(74) *Attorney, Agent, or Firm* — Dykema Gossett PLLC

(57) ABSTRACT

A mixing apparatus adapted for mixing the flow of intake air and exhaust gas in a mixing chamber of a combustion engine including a housing having a bore formed therethrough extending between a first open end and a second open end. The housing includes a plurality of apertures formed in a side wall thereof adjacent the first open end. A retention member is formed in the side wall adjacent the second open end and is adapted to secure the mixing apparatus within the mixing chamber. The mixing apparatus includes a flow deflector disposed in the bore of the housing. The flow deflector includes a plurality of curved deflector surfaces formed therein which correspond in number to and are aligned with the plurality of apertures. An end cap is secured to the housing at the first open end thereof for closing the bore at the first open end.

20 Claims, 5 Drawing Sheets

MIXER FOR USE IN AN EXHAUST GAS RECIRCULATION SYSTEM AND METHOD FOR ASSEMBLY OF THE SAME

BACKGROUND

This invention relates in general to a mixing apparatus for mixing fluid flows in a combustion engine, and more particularly to a mixing apparatus for mixing recirculated exhaust gas in a combustion engine.

Exhaust gas recirculation (EGR) is a known method that is used to reduce the Nitrogen oxide (NOx) emissions in internal combustion engines. A conventional EGR system includes a control valve, also referred to as an EGR valve, that regulates the amount of exhaust gas that is taken from an engine exhaust manifold and which is mixed with intake air for recirculation back to the engine via an engine intake manifold.

The EGR valve is located on an associated component of the engine, typically at a point directly upstream of the intake manifold of the engine. The EGR valve is a valve which opens a passageway between the exhaust and intake manifold to allow a specific amount of the engines exhaust gas to recirculate back to the combustion cycle of the engine. The recirculation provided by the EGR valve helps to reduce combustion temperatures thereby reducing or preventing the formation of NOx emissions. NOx emissions are primarily formed when a mixture of nitrogen and oxygen is subjected to high temperatures.

The recirculated exhaust gas is typically mixed with incoming fresh air in an EGR mixer prior to introduction back into the engine combustion cycle. The flow characteristics of the exhaust gas as it enters and moves through the EGR mixer affects the efficiency of mixing with the incoming fresh air. Adequate mixing of the exhaust gas with the incoming fresh air may avoid performance degradation and help to minimize mixing losses in order to avoid fuel consumption penalties.

Although numerous designs and configurations of EGR mixers have been developed in the past, it would be beneficial to provide an improved mixing apparatus that reduces component weight and increases the ease of manufacturing the mixing apparatus and assembling the mixing apparatus within the EGR system.

SUMMARY OF THE INVENTION

This invention relates to a mixing apparatus adapted to be disposed in an intake manifold of a combustion engine for mixing the flow of intake air and exhaust gas in a mixing chamber of the combustion engine. The mixing apparatus includes a housing having a bore formed therethrough extending between a first open end and a second open end. The housing further includes a plurality of apertures formed in a side wall thereof adjacent the first open end. A retention member is formed in the side wall of the housing adjacent the second open end and is adapted to secure the mixing apparatus within the intake manifold. The mixing apparatus further includes a flow deflector disposed in the bore of the housing. The flow deflector includes a plurality of curved deflector surfaces formed therein which correspond in number to and are aligned with the plurality of apertures formed in the housing. An end cap is secured to the housing at the first open end thereof for closing the bore at the first open end.

In another embodiment, this invention relates to an intake manifold of a combustion engine adapted to mix a flow of intake air and exhaust gas in a mixing chamber of the combustion engine. The intake manifold includes a mixing chamber having a mixing apparatus disposed therein. The mixing apparatus includes a housing, a flow deflector disposed in the housing, and an end cap. The housing includes a bore formed therethrough extending between a first open end and a second open end. The housing further includes a plurality of apertures formed in a side wall thereof adjacent the first open end. A retention member is formed in a side wall thereof adjacent the second open end which is adapted to secure the mixing apparatus within the mixing chamber. The flow deflector is disposed in the bore of the housing and includes a plurality of curved deflector surfaces formed therein which correspond in number to and are aligned with the plurality of apertures formed in the housing. The end cap is secured to the housing at the first open end thereof for closing the bore at the first open end.

In yet another embodiment, the invention relates to an intake manifold of a combustion engine adapted to mix a flow of intake air and exhaust gas. The intake manifold includes a mixing chamber defining an internal cavity. The mixing chamber has a first passage configured to receive the flow of exhaust gas into the internal cavity. A second passage is configured to receive the flow intake air into the internal cavity. A third passage is configured to discharge a mixture of the exhaust gas and intake air from the internal cavity. A mixing apparatus is disposed within the first passage. The mixing apparatus includes a housing, a flow deflector disposed in the housing, and an end cap. The housing includes a bore formed therethrough extending between a first open end and a second open end. The housing further includes a plurality of apertures formed in a side wall thereof adjacent the first open end. A retention member extends radially outward from the side wall and is formed adjacent the second open end. The retention member is adapted to secure the mixing apparatus within the first passage of the intake manifold for receiving the flow of exhaust gas. The flow deflector is disposed in the bore of the housing and includes a plurality of concave deflector surfaces formed therein which correspond in number to and are aligned with the plurality of apertures formed in the housing. The flow deflector further including a plurality of dividing walls extending radially between and partially defining each of the apertures. The end cap is secured to the housing at the first open end thereof for closing the bore at the first open end. The end cap includes a generally conically shaped surface configured to disperse the flow of intake air uniformly about an outer periphery of the mixing apparatus.

Other advantages of this invention will become apparent to those skilled in the art from the following detailed description of the preferred embodiments, when read in light of the accompanying drawings.

DETAILED DESCRIPTION OF THE INVENTION

The present invention will now be described with reference to the specific embodiments of the invention set forth herein.

This invention may, however, be embodied in different forms and should not be construed as limited to the embodiments set forth herein. Rather, these embodiments are provided so that this disclosure will be thorough and complete, and will fully convey the scope of the invention to those skilled in the art. Moreover, the described embodiments were selected for description to enable one of ordinary skill in the art to practice the invention.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Figure 1:
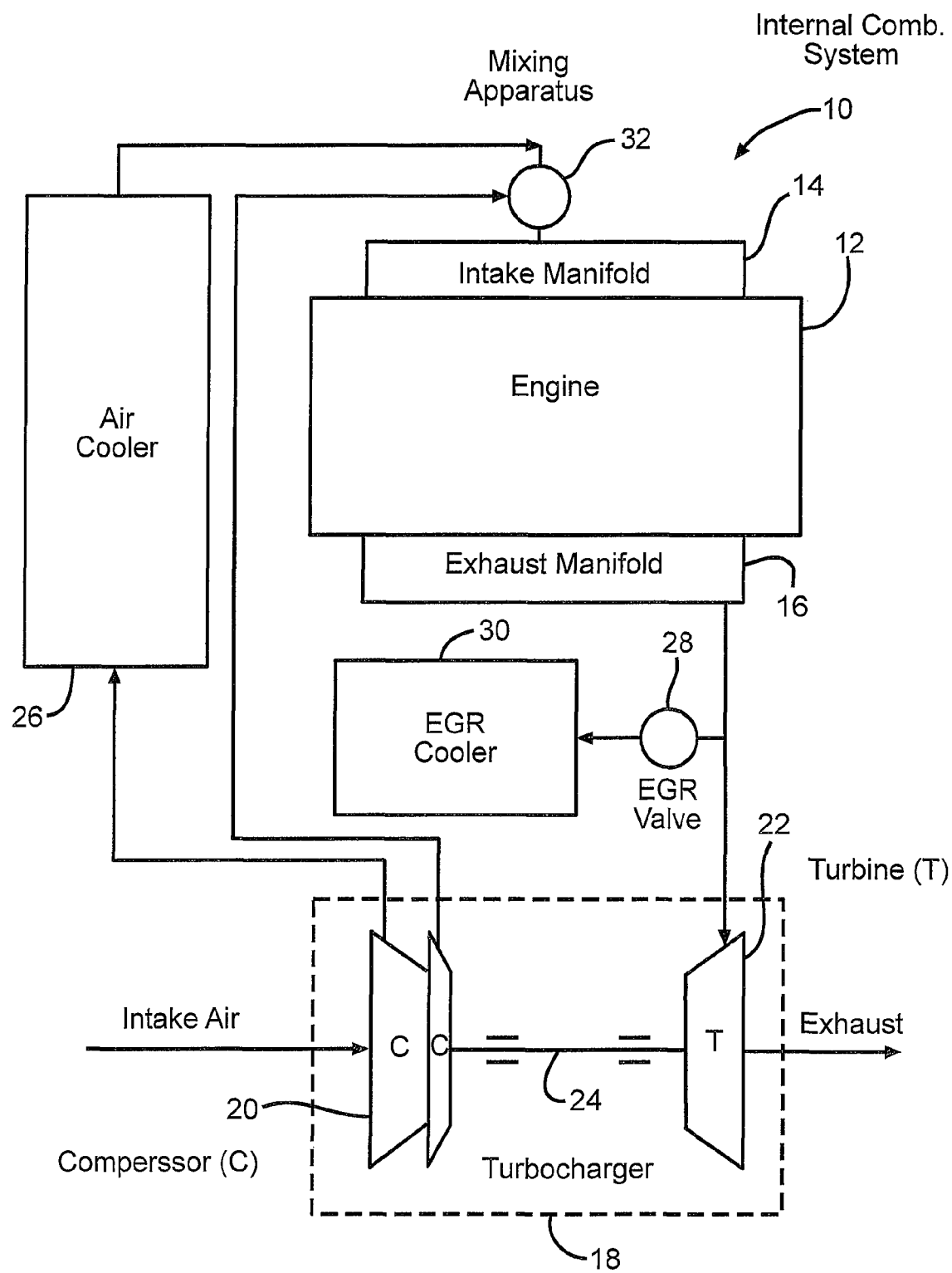
FIG. 1 is a schematic diagram of an internal combustion system incorporating an embodiment of a mixing apparatus of the present invention.

Referring now to the drawings, there is illustrated in FIG. 1 a schematic diagram of an internal combustion system, indicated generally at 10, incorporating an exemplary embodiment of a mixing apparatus 32 of the present invention. FIG. 1 serves only to illustrate an application of this invention, which will become clear through the description and claims that follow with particular attention to the details regarding the mixing apparatus 32.

The illustrated internal combustion system 10 includes a combustion engine 12 having an intake manifold 14 and an exhaust manifold 16. The combustion engine 12 may be any internal combustion engine, such as for example a diesel or gasoline engine. The illustrated internal combustion system 10 may also include a turbocharger 18, generally having a compressor 20 and a turbine 22. The compressor is configured to compress the intake air of the combustion engine 12 and is driven by a shaft 24 connected to the turbine 22. The turbine 22 receives the exhaust gas from the exhaust manifold 16 of the combustion engine 12 thereby providing rotational power to the turbine 22. The exhaust gas then exits the turbine 22 and is exhausted to the atmosphere via conventional conduit or ducting.

The intake air is heated during the compression process and therefore desirable to be cooled to satisfy engine durability and performance requirements. Such a cooling process may be accomplished by routing the heated compressed air from the compressor 20 via conventional conduit or ducting to an air cooler 26, such as for example a heat exchanger. The cooled compressed intake air is then routed from the air cooler 26 to a point further downstream, for example to the intake manifold 14 of the engine 12 via conventional conduit or ducting.

The illustrated system 10 also includes an EGR system. The EGR system includes a control valve, also known as an EGR valve 28, typically located in conduit or ducting between the exhaust manifold 16 and the turbine 22. The EGR valve 28 selectively routes a portion of the exhaust gas from the exhaust manifold 16 through the EGR system. The EGR valve 28 regulates the proportion of exhaust gas that is taken from the exhaust manifold 16 and returned to the engine induction system for mixing with the intake air. Otherwise, the exhaust gas is directed to the turbine 22 of the turbocharger and out of the vehicle to the atmosphere.

In the illustrated embodiment, the EGR system also includes an EGR cooler 30, such as for example a heat exchanger. The EGR cooler 30 is configured to cool the recirculated exhaust gas routed through the EGR system by the EGR valve 28, although cooling of the recirculated exhaust gas is not required. By providing the EGR cooler 30 in the EGR system, the efficiency of the combustion engine 12 is improved. Other advantages, such as a reduction in NOx and particle emissions and in fuel consumption also result from the presence of the EGR cooler 30.

In the illustrated embodiment, the recirculated exhaust gas passing through the EGR system is then combined with the intake air being supplied directly by the compressor 20 and/or supplied indirectly by the compressor 20 via the air cooler 26 by the mixing apparatus 32. The mixing apparatus 32 combines the recirculated exhaust flow with the compressed intake air to create a substantially homogenous mixture of flow stream for introduction into the engine combustion cycle.

Figure 2:
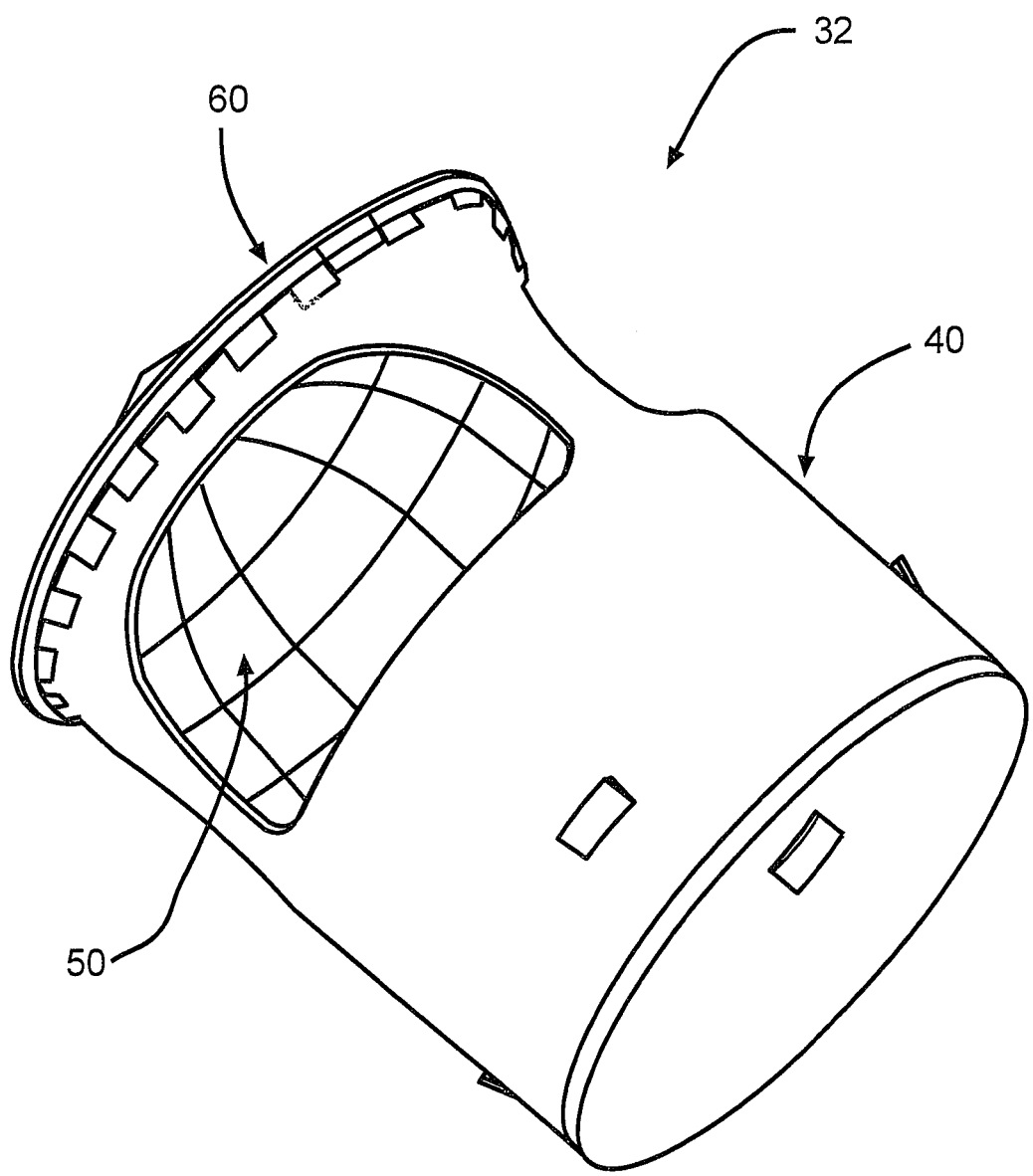
FIG. 2 is a perspective view of an exemplary embodiment of the mixing apparatus of the present invention
Figure 3:
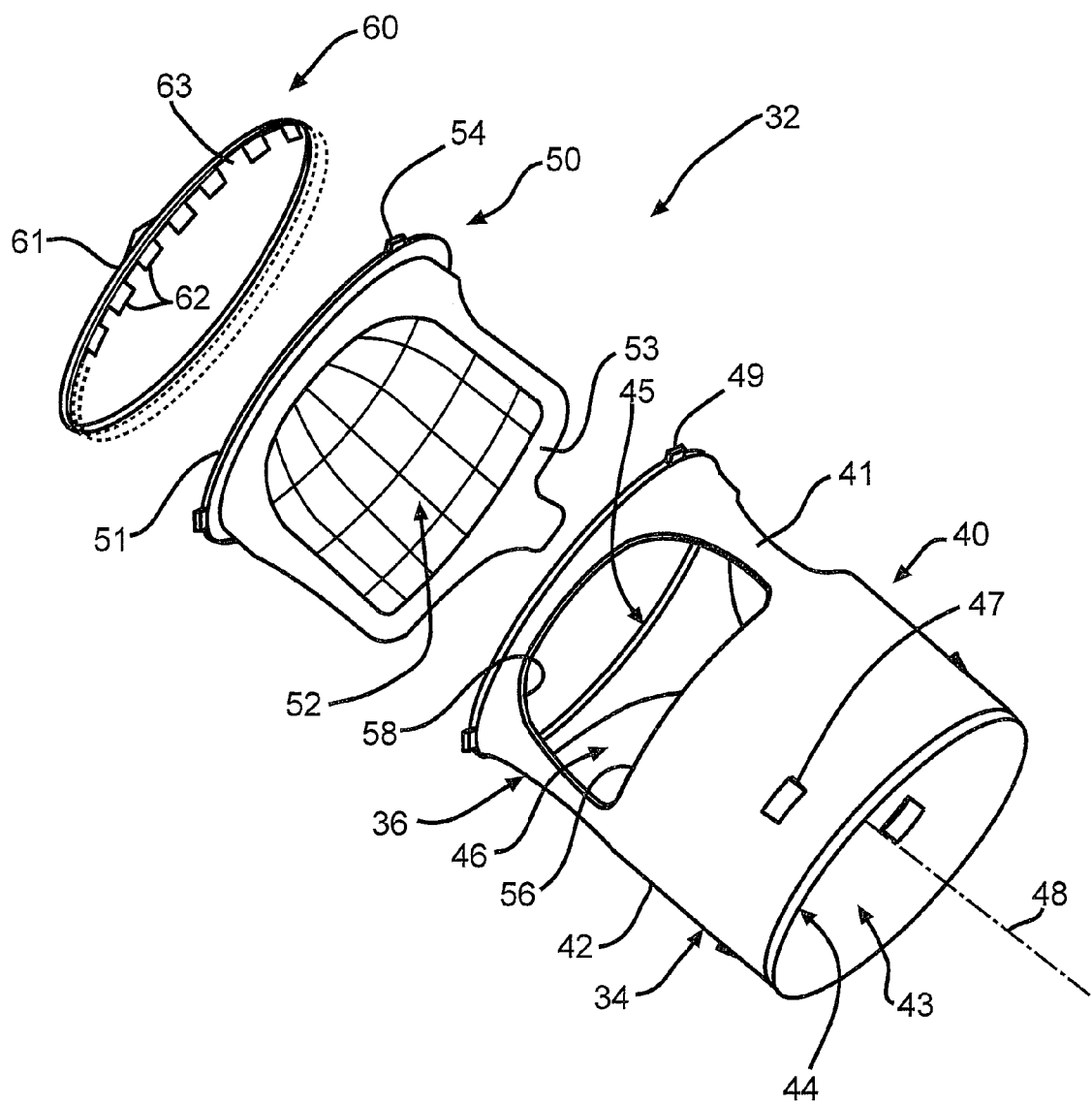
FIG. 3 is an exploded perspective view of an exemplary embodiment of the mixing apparatus of the present invention.

Referring now to FIGS. 2 and 3, there is illustrated an exemplary embodiment of the mixing apparatus 32 adapted for mixing fluid flows in a mixing chamber of a combustion engine 12. As shown therein, the mixing apparatus 32 includes a first member or housing 40, a second member or flow deflector 50, and a third member or end cap 60. Each of the individual members will now be described in detail, along with methods of assembling the mixing apparatus 32.

As best shown in FIG. 3, the housing 40 is formed having a generally hollow, cylindrical wall 42 including a first portion 34 and a second portion 36. The cylindrical wall 42 forms a side wall of the housing 40. The housing 40 includes a bore 43 extending therethrough between a first open end 44 adjacent the first portion 34 and a second open end 45 adjacent the second portion 36. The housing 40 further defines a longitudinal axis 48 of the mixing apparatus 32. Alternatively, the housing 40 may be any suitable structure or assume any suitable shape for the mixing of fluid flows in the combustion engine 12.

The housing 40 includes a plurality of apertures 46 for providing fluid communication with the bore 43. As illustrated, the apertures 46 are spaced about the cylindrical wall 42 of the housing 40 and extend in an axial direction along the longitudinal axis 48. The apertures 46 may be located along the second portion 36 of the housing 40 in close proximity and adjacent the second open end 45. However, the apertures 46 may be located along any portion of the housing 40 if so desired. Located adjacent and in between each of the apertures 46 are supporting walls 41 for partially defining the apertures 46 and supporting the second portion 36 of the housing 40. In the illustrated embodiment, the housing 40 includes three of such apertures 46. However, the number of apertures 46 may be other than illustrated if so desired as will be described below.

The apertures 46 form window like structures defined by the cylindrical wall 42 having generally arch like shapes. To accomplish this, the apertures 46 have a first or substantially straight edge 56 extending about a portion of the cylindrical wall 42 intermediate the first portion 34 and the second portion 36. A second or substantially arcuate edge 58 is connected to both ends of the first edge 56 and extends in an axial direction along the second portion 36 toward the second open end 45. It has been found that this configuration provides sufficient air flow while also meeting intended design requirements for mixing of the exhaust gas and the intake air.

In the illustrated embodiment, the housing 40 also preferably includes a plurality of "retention" tabs 47. As illustrated, the retention tabs 47 are spaced about the circumference of the cylindrical wall 42 and are located along the first portion 36 of the housing 40 in close proximity to the first open end 44. The retention tabs 47 extend in a radially outward direction away from the cylindrical wall 42 thereby forming protrusions, and are angled to extend in an axial direction toward the second portion 36 of the housing 40. This configuration enables the mixing apparatus 32 to be installed within the intake manifold 14, as will be described below. The retention tabs 47 may, however, be located along or extend from any portion of the housing 40 is so desired. Alternatively, it should be fully appreciated that the mixing apparatus 132 may be secured within the intake manifold 14 using any suitable method or process, including but not limited to a welding process, threaded design, and/or the use of adhesives.

The retention tabs 47 are preferably formed by pressing a rectangular portion of the cylindrical wall 42 outward in a radial direction away from the longitudinal axis 48. The retention tabs 47 remain attached to the cylindrical wall 42 along at least one edge of the tab such that the retention tabs 47 are able to slightly move or flex in a radially inward direction during assembly. Alternatively, the shape, number, construction and/or design of the retention tabs 47 may be other than illustrated and described if so desired.

In the illustrated embodiment, the housing 40 also preferably includes at least one aligning structure 49. The aligning structure 49 is configured to properly enable the assembly and alignment of the flow deflector 50 within the housing 40. As will be described below, the aligning structure 49 is also configured to prevent the flow deflector 50 from rotating relative to the housing 40 following assembly of the end cap 60. As illustrated, the aligning structure 49 is located on an end portion of the housing 40 adjacent the second open end 45 and is formed as a generally flat tab extending radially outwardly from the housing 40, the function of which will be described below. Alternatively, any suitable structure or method for properly aligning the flow deflector 50 within the housing 40 and preventing the flow deflector 50 from rotating relative to the housing 40 may be utilized, such as for example a tongue-and-groove structure or guiding walls.

The housing 40 may be formed from any material suitable for the desired application, such as the illustrated internal combustion system 10. For example, the operating temperature of the combustion engine 12 may reach approximately 250° C. (482° F.) or higher. Additionally, the operating conditions of the combustion engine 12 can generate an environment corrosive to certain materials over a period of time. Thus, it would be desirable to form the housing 40 from a material that is capable of withstanding sufficiently high temperatures while also being resistant to corrosion over the expected life of the mixing apparatus 32. To accomplish this, it has been found that an SAE 300 series stainless steel material may be desirable. However, it should be appreciated that any suitable material for the desired application may be used to form the housing 40.

In order to reduce the overall weight of the mixing apparatus 32, the housing 40 is preferably formed by a stamping process utilizing a single piece of stainless steel material. It should be fully appreciated that the housing 40 may also be formed from any number of stamped components rigidly fixed together to form the generally hollow, cylindrical wall. Alternatively, the shape, construction and/or design of the housing 40 may be other than illustrated and described if so desired. For example, the housing 40 may be formed in any suitable manner, including but not limited to a casting process, molding process, machining process, or any combination thereof.

In the illustrated embodiment, the flow deflector 50 is disposed within the housing 40 through the second open end 45. The flow deflector 50 preferably includes a plurality of deflecting surfaces 52 separated and partially defined by an equal number of dividing walls 53. The deflecting surfaces 52 form indentations or cavities defined by the flow deflector 50 that provide fluid communication between the bore 43 and the apertures 46 of the housing 40. As illustrated, the deflecting surfaces 52 are curved inwardly thus forming concave depressions. The flow deflector 50 is configured to promote the mixing of exhaust gas with the intake air, as will be described below. As such, it should be appreciated that the deflecting surfaces 52 may be configured in any suitable manner to promote the mixing of the exhaust gas with the intake air, including but not limited to a plurality of planar surfaces mating at varying angles to form the deflecting surfaces 52.

In the illustrated embodiment, the dividing walls 53 are positioned adjacent to and in between each of the deflecting surfaces 52 thereby separating and partially defining the deflecting surfaces 52. As best illustrated in FIG. 3, the dividing walls 53 may converge along the longitudinal axis 48 and extend radially outward for mating contact with an inner surface of the cylindrical wall 42 of the housing 40. The dividing walls 53 segregate the exhaust gas into separate streams and direct the separate streams toward the deflecting surfaces 52.

In the illustrated embodiment, the flow deflector 50 preferably includes a radially extending lip 51 positioned at least partially about the circumference of the flow deflector 50 and located on an end portion thereof. When the flow deflector 50 is inserted into the second open end 45, the lip 51 comes into mating contact with an edge of the housing 40 that defines the second open end 45. The lip 51 is configured to prevent axial movement of the flow deflector 50 along the longitudinal axis 48 relative to the housing 40, as will be described below. As such, the lip 51 may be embodied as any structure suitable for preventing axial movement of the flow deflector 50 relative to the housing 40. It should be further appreciated that the housing 40 may include any suitable structure, such as a radially extending surface or the like, for preventing axial movement of the flow deflector 50 within the housing 40.

When the flow deflector 50 is disposed within the housing 40 as described above, the dividing walls 53 are aligned with and contact the supporting walls 41 of the housing 40. As such, the deflecting surfaces 52 are aligned with the apertures 46 so as to provide fluid communication between the bore 43 and the apertures 46. It has been found desirable to include a quantity of three (3) deflecting surfaces 52 and three (3) dividing walls 53 cooperating with a quantity of three (3) apertures 46, although any number may be included.

In the illustrated embodiment, the flow deflector 50 preferably includes at least one aligning structure 54. The aligning structure 54 is configured to properly enable the assembly and alignment of the flow deflector 50 within the housing 40. The aligning structure 54 is also configured to prevent the flow deflector 50 from rotating relative to the housing 40 following assembly of the end cap 60. As illustrated, the aligning structure 54 is located on an end portion of the flow deflector 50. The aligning structure 54 can be a generally flat tab extending radially outward from the flow deflector 50. As will be described below, the aligning structure 54 located on the flow deflector 50 cooperates with the aligning structure 49 located on the housing 40 to align the deflecting surfaces 52 of the flow deflector 50 with the apertures 46 of the housing 40. Alternatively, any suitable method for properly aligning the flow deflector 50 within the housing 40 and preventing the flow deflector 50 from rotating relative to the housing 40 may be utilized, such as for example a tongue-and-groove structure or guiding walls.

In the illustrated embodiment, the flow deflector 50 is preferably hollow and is formed by a stamping process similar to that described above for formation of the housing 40. The flow deflector 50 may also be formed of any material suitable to withstand high temperatures and a corrosive environment over the expected life of the flow deflector 50, similar to that described above for the housing 40. Alternatively, the shape, construction, and/or design of the flow deflector 50 may be other than illustrated and described if so desired.

In the illustrated embodiment, the end cap 60 is configured to enclose the second open end 45 of the housing 40 and to secure the flow deflector 50 to the housing 40. As such, the end cap 60 preferably includes a flange 61 located about the outer circumference of the end cap 60 and extending an axial distance. A plurality of tabs 62 spaced apart about a circumference of the flange 61 and extending from an end portion thereof. When the end cap 60 is positioned over the second open end 45, the plurality of tabs 62 are crimped or otherwise secured to the housing 40 for rigidly securing the end cap 60 to the housing 40. In doing so, the end cap 60 contacts the lip 51 of the flow deflector 50 thereby securing the flow deflector 50 within the housing 40 and preventing axial movement of the flow deflector 50 therein. Alternatively, the end cap 60 may be secured to the housing 40 in any manner suitable for the described application, including but not limited to a threaded design, fasteners, or a welding process.

As best shown in FIG. 3, the end cap 60 preferably includes at least one recess 63 defined by the flange 61. When the end cap 60 is placed in proper position over the second open end 45, the aligning structure 54 of the flow deflector 50 is aligned with the aligning structure 49 of the housing 40 and both aligning structures are disposed within the recess 63. Once the end cap 60 is secured to the housing 40, the recess 63 is configured to prevent rotation of the flow deflector 50 relative to the housing 40. It should be fully appreciated, however, that the end cap 60 may be configured to prevent rotation of the flow deflector 50 in any suitable manner, using any suitable structure.

Figure 4:
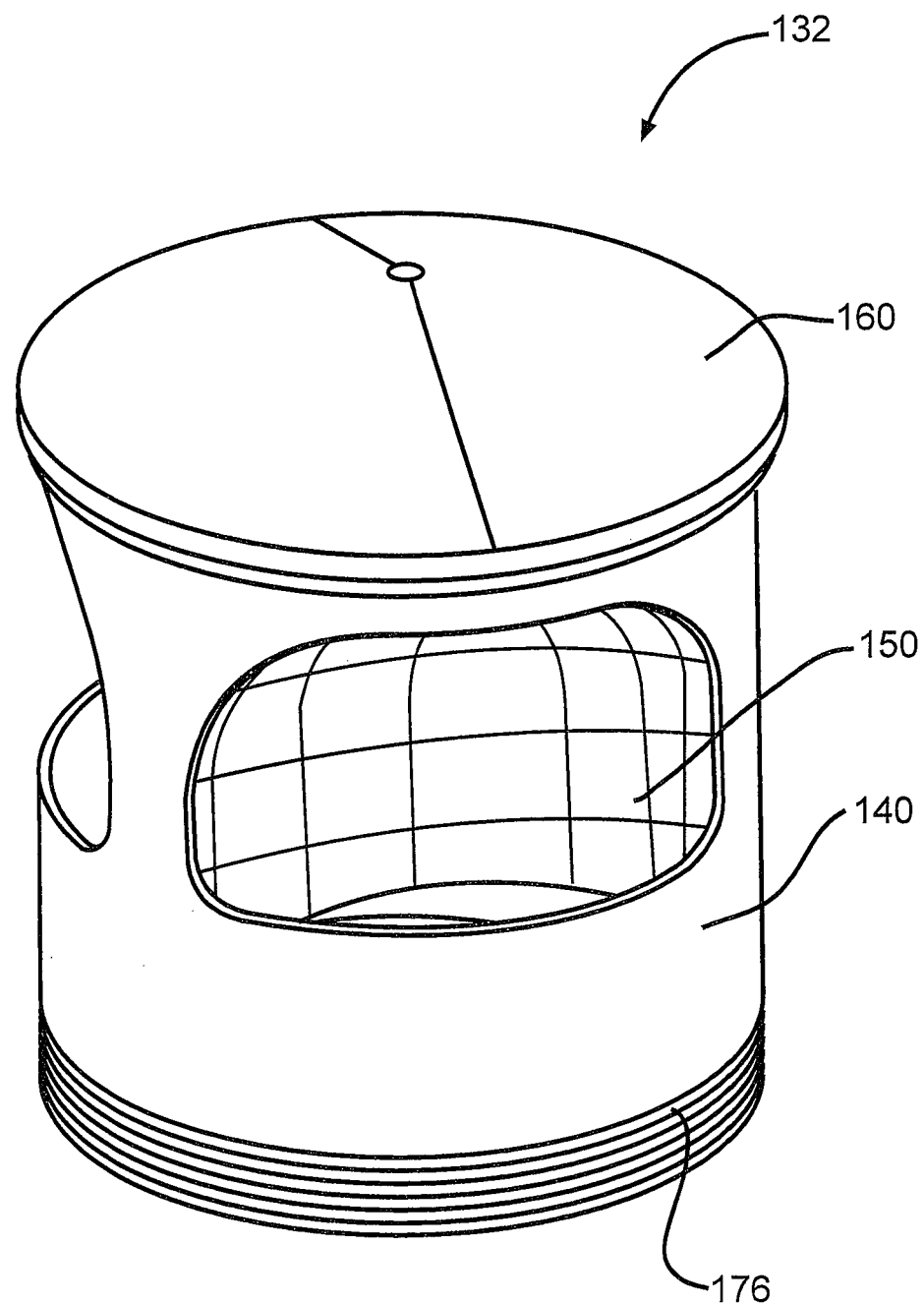
FIG. 4 is a perspective view of an alternative embodiment of the mixing apparatus of the present invention.

The end cap 60 is preferably configured to promote mixing of the intake air with the exhaust gas, as will be further described below. To accomplish such a function, the end cap 60 includes an outer surface defining a generally conical shape, as best shown in FIG. 4. As a flow of air comes into direct contact with the end cap 60, the conical shape of the end cap 60 is configured to disperse the flow uniformly about the outer periphery of the mixing apparatus 32. Alternatively, the end cap 60 may be embodied as any shape suitable to promote mixing of the exhaust gas with the intake air.

In the illustrated embodiment, the end cap 60 is preferably generally hollow and formed by a stamping process similar to that described above for the formation of the housing 40. The end cap 60 may also be formed of any material suitable to withstand high temperatures and a corrosive environment over the life of the end cap 60, similar to that described above for the housing 40. Alternatively, the shape, construction, and/or design of the end cap 60 may be other than illustrated and described if so desired.

Referring to FIG. 4, there is illustrated an alternative embodiment of the mixing apparatus 132 in accordance with the present invention. In this embodiment, the mixing apparatus 132 is formed from a single piece of material, such as for example by a casting or molding process, and includes a housing portion 140, a flow deflector portion 150, and an end cap portion 160. The single piece of material may then be machined or otherwise formed to the desired shape and dimensions as so required. As such, it should also be fully appreciated that the mixing apparatus 132 may be formed from any number of components. For example, the flow deflector portion 150 and the end cap portion 160 may be combined into a single component for attachment to a separately formed housing portion 140. Alternatively, the housing portion 140 and the flow deflector portion 150 may be combined into a single component for attachment to a separately formed end cap portion 160.

In the alternative embodiment, the mixing apparatus 132 is configured to be a serviceable part which can be removed from the intake manifold 14 for replacement of the mixing apparatus 132 is so desired. It is to be noted that the mixing apparatus 32 of the first embodiment may be a serviceable part as well, but may be more difficult to remove from the intake manifold 14. To accomplish this, the mixing apparatus 132 as shown in the illustrated embodiment may include a threaded portion 176 configured to mate with a threaded portion (not shown) located on a diameter of the exhaust gas supply duct 170. The threaded portion 176 enables the mixing apparatus 132 to be connected to the exhaust gas supply duct 170 in such a manner to be easily removed from the intake manifold 114. Alternatively, the shape, construction and/or design of the mixing apparatus 132 including other methods for securing it in the intake manifold 114 may be other than illustrated and described if so desired.

Figure 5:
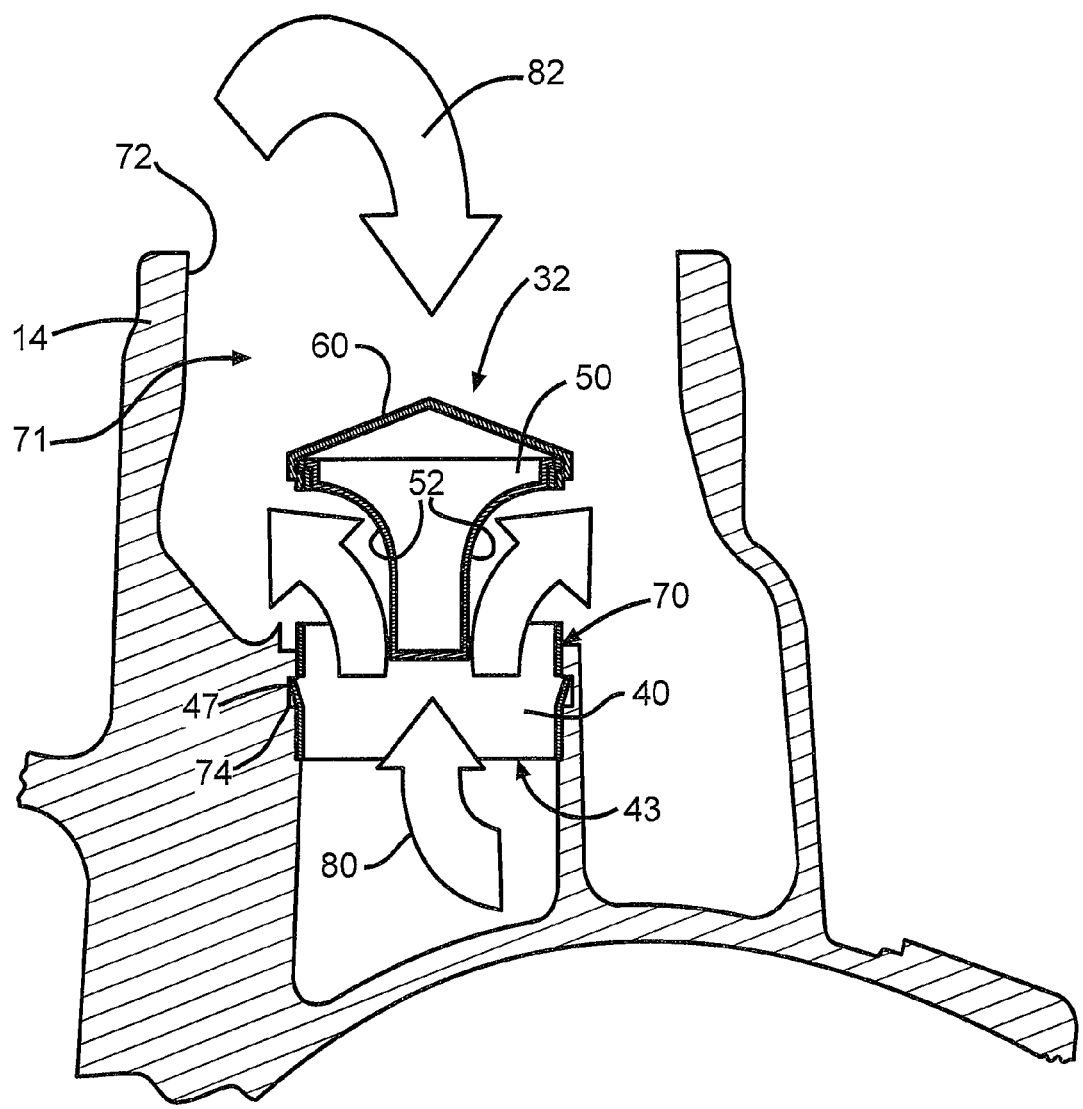
FIG. 5 is a sectional view of a portion of a vehicle engine incorporating an embodiment of the mixing apparatus of the present invention.

Referring to FIG. 5, once the mixing apparatus 32 (or the mixing apparatus 132) is fabricated or otherwise assembled as described above, the mixing apparatus 32 is then incorporated within the EGR system. The intake manifold 14 preferably defines a mixing chamber or internal cavity 71 having an exhaust gas supply duct 70. The exhaust gas supply duct 70 is configured to receive a first fluid flow into the internal cavity 71 such as the recirculated exhaust gas being routed through the EGR system. The intake manifold 14 also includes an intake air supply duct 72. The intake air supply duct 72 is configured to receive a second fluid flow into the internal cavity 71 such as the intake air being supplied directly by the compressor 20 and/or supplied indirectly by the compressor 20 via the air cooler 26. The intake manifold 14 further includes a discharge duct (not shown) configured to discharge a mixture of the first and second fluid flows from the internal cavity 71 and into the combustion cycle for aspiration by the combustion engine 12.

In the illustrated embodiment, the mixing apparatus 32 (or the mixing apparatus 132) is preferably disposed within the intake manifold 14 directly in the exhaust gas supply duct 70. The exhaust gas supply duct includes an undercut or groove 74 extending at least partially about a diameter thereof, for example the inner diameter. The groove 74 is formed so as to cooperate with the retention tabs 47 of the housing 40. The first portion 34 of the housing 40 is inserted into the exhaust gas supply duct 70 until the retention tabs 47 are snapped into or otherwise engaged by and retained in the groove 74. The retention tabs 47 and groove 74 are configured to permanently secure the mixing apparatus 32 in position within the intake manifold 14 as illustrated. A purpose of the mixing apparatus 32 is to promote mixing of the exhaust gas and the intake air, and as such the mixing apparatus 32 may be located in any suitable location to accomplish such a purpose.

During operation of the combustion engine 12, recirculated exhaust gas enters the bore 43 through the first open end 44 of the mixing apparatus 32 (or the mixing apparatus 132) along the longitudinal axis 48, as indicated by arrow 80. The exhaust gas is then divided into separate streams by the dividing walls 53 of the flow deflector 50 and directed towards the deflecting surfaces 52. The deflecting surfaces 52 direct the streams of exhaust gas in a substantially radial direction through the apertures 46 and out of the bore 43 in a uniform fashion about an outer periphery of the mixing apparatus 32. The streams of exhaust gas are directed through the apertures 46 in a desired motion to promote mixing, such as for example in a swirling motion or twisting motion.

Simultaneously, a supply of intake air enters the intake manifold 14 through the intake air supply duct 72 and flows into direct contact with the end cap 60 of the mixing apparatus 32 (or the mixing apparatus 132), as indicated by arrow 82. The end cap 60 is configured to disperse the intake air uniformly about the outer periphery of the mixing 32 thus promoting mixing with the separate streams of exhaust gas that are simultaneously being directed out of the apertures 46 in a uniform fashion about an outer periphery of the mixing apparatus 32. Thus, the mixing apparatus 32 provides a homogenous mixture of intake air and exhaust gas to be delivered out of the intake manifold 14 through the discharge duct (not shown) and into the combustion cycle for aspiration by the combustion engine 12.

Although the present invention is illustrated and described in conjunction with the particular internal combustion system disclosed herein, it will be appreciated that the invention can be used in conjunction with other types or configurations of internal combustion system constructions, if so desired. For example, as shown herein or with modifications thereto, the present invention may be used in connection with any other associated desired types of internal combustion system, such as shown for example in U.S. Pat. No. 6,945,199 B2 to Kapala et al. and U.S. Pat. No. 7,370,620 to Nino et al., and U.S. Pat. No. 7,316,215 to Nino et al., the disclosures of all of these patents incorporated by reference in entirety herein. It should also be fully appreciated that the present invention is not limited to use within an EGR system but may be used to mix any fluid flows within an internal combustion engine.

One advantage of the present invention is to provide a mixing apparatus 32, 132 having reduced weight while effectively performing the intended mixing functions. Another advantage of the present invention is to provide a mixing apparatus 32, 132 that is cost effective to manufacture and easy to assemble. Yet another advantage of the present invention is to provide a mixing apparatus 32, 132 adapted to be easily installed within an internal combustion system, for example within an intake manifold. These and other advantages should become apparent to those skilled in the art after a thorough understanding of the specification and the claims.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A mixing apparatus adapted to be disposed in an intake manifold of a combustion engine for mixing the flow of intake air and exhaust gas in a mixing chamber of the combustion engine, the mixing apparatus comprising:
a housing including a bore formed therethrough extending between a first open end and a second open end, the housing including a plurality of apertures formed in a side wall thereof adjacent the first open end and including a retention member formed in the side wall thereof adjacent the second open end which is adapted to secure the mixing apparatus within the intake manifold;
a flow deflector disposed in the bore of the housing and including a plurality of curved deflector surfaces formed therein which correspond in number to and are aligned with the plurality of apertures formed in the housing; and
an end cap secured to the housing at the first open end thereof for closing the bore at the first open end.

2. The mixing apparatus of claim 1 wherein the apertures formed in the side wall are spaced circumferentially about a longitudinal axis defined by the bore.

3. The mixing apparatus of claim 1 wherein the apertures formed in the side wall define a generally arch like shape extending axially toward the first open end of the housing.

4. The mixing apparatus of claim 1 wherein the flow deflector includes a plurality of dividing walls connected to one another along a longitudinal axis defined by the bore, the dividing walls extend radially between each of the apertures.

5. The mixing apparatus of claim 4 wherein the dividing walls form a portion of the curved deflector surfaces.

6. The mixing apparatus of claim 1 wherein the curved deflector surfaces are curved inwardly thus forming concave depressions.

7. The mixing apparatus of claim 1 wherein the retention member includes at least one retention tab extending radially outward from the side wall configured to secure the mixing apparatus within the intake manifold.

8. The mixing apparatus of claim 1 wherein the retention member includes a threaded section configured to secure the mixing apparatus within the intake manifold.

9. The mixing apparatus of claim 1 further including an aligning structure located on at least one of the housing and the flow deflector, wherein the aligning structure is configured to properly position the flow deflector within the housing such that the curved deflector surfaces are aligned with the apertures.

10. The mixing apparatus of claim 1 further including a radially extending lip located on at least one of the housing and the flow deflector, wherein the radially extending lip is configured to prevent axial movement of the flow deflector relative to the housing.

11. The mixing apparatus of claim 1 wherein the end cap includes a generally conically shaped surface configured to uniformly disperse the flow of intake air about an outer periphery of the mixing apparatus.

12. The mixing apparatus of claim 1 wherein the end cap includes a plurality of tabs spaced about an outer circumference thereof, the tabs being configured to contact the housing and secure the end cap to the housing.

13. The mixing apparatus of claim 1 wherein the flow deflector and the end cap are generally hollow members.

14. The mixing apparatus of claim 1 wherein the mixing apparatus is formed from a stainless steel material.

15. The mixing apparatus of claim 14 wherein the stainless steel material conforms to the standards of SAE 300 series stainless steel.

16. An intake manifold of a combustion engine adapted to mix a flow of intake air and exhaust gas, the intake manifold comprising:
a mixing chamber having a mixing apparatus disposed therein, the mixing apparatus including a housing, a flow deflector disposed in the housing, and an end cap;
wherein the housing includes a bore formed therethrough extending between a first open end and a second open end, the housing including a plurality of apertures formed in a side wall thereof adjacent the first open end and including a retention member formed in a side wall thereof adjacent the second open end which is adapted to secure the mixing apparatus within the mixing chamber;
wherein the flow deflector is disposed in the bore of the housing and includes a plurality of curved deflector surfaces formed therein which correspond in number to and are aligned with the plurality of apertures formed in the housing; and wherein the end cap is secured to the housing at the first open end thereof for closing the bore at the first open end.

17. The intake manifold of claim 16 wherein the intake manifold includes an internal diameter having an undercut, the mixing apparatus being inserted into the internal diameter such that the retention member formed in the side wall of the housing is disposed within the undercut.

18. The intake manifold of claim 16 wherein the mixing apparatus is disposed within the intake manifold such that the flow of exhaust gas is received into the bore of the mixing apparatus through the second open end.

19. The intake manifold of claim 16 wherein the end cap includes a generally conically shaped surface, the mixing apparatus being disposed within the intake manifold such that the flow of intake air is configured to flow into direct contact with the conically shape surface.

20. An intake manifold of a combustion engine adapted to mix a flow of intake air and exhaust gas, the intake manifold comprising:

a mixing chamber defining an internal cavity, the mixing chamber having a first passage configured to receive the flow of exhaust gas into the internal cavity, a second passage configured to receive the flow intake air into the internal cavity, and a third passage configured to discharge a mixture of the exhaust gas and intake air from the internal cavity; and a mixing apparatus disposed within the first passage, the mixing apparatus including a housing, a flow deflector disposed in the housing, and an end cap;

wherein the housing includes a bore formed therethrough extending between a first open end and a second open end, the housing including a plurality of apertures formed in a side wall thereof adjacent the first open end and including a retention member extending radially outward from the side wall and formed adjacent the second open end, the retention member being adapted to secure the mixing apparatus within the first passage of the intake manifold for receiving the flow of exhaust gas;

wherein the flow deflector is disposed in the bore of the housing and includes a plurality of concave deflector surfaces formed therein which correspond in number to and are aligned with the plurality of apertures formed in the housing, the flow deflector further including a plurality of dividing walls extending radially between and partially defining each of the apertures; and wherein the end cap is secured to the housing at the first open end thereof for closing the bore at the first open end, the end cap including a generally conically shaped surface configured to disperse the flow of intake air uniformly about an outer periphery of the mixing apparatus.

* * * * *